United States Patent
Sichera et al.

(10) Patent No.: US 6,736,589 B2
(45) Date of Patent: May 18, 2004

(54) METHOD AND DEVICE FOR TRANSFERRING COMPACT DISCS TO A PACKAGING LINE

(76) Inventors: Gianni Sichera, Via Provinciale Cento, 16/B, Pieve Di Cento (IT); Massimiliano Sichera, Via Renazzo, 63, Renazzo Di Cento (IT)

(*) Notice: Subject to any disclaimer, the term of this patent is extended or adjusted under 35 U.S.C. 154(b) by 93 days.

(21) Appl. No.: 10/203,606
(22) PCT Filed: Feb. 21, 2001
(86) PCT No.: PCT/IB01/00226
§ 371 (c)(1), (2), (4) Date: Aug. 12, 2002
(87) PCT Pub. No.: WO01/62597
PCT Pub. Date: Aug. 30, 2001

(65) Prior Publication Data
US 2003/0021669 A1 Jan. 30, 2003

(30) Foreign Application Priority Data
Feb. 22, 2000 (IT) ..................... BO2000A0084

(51) Int. Cl.⁷ ............... B66C 1/00; B66C 3/00; B66C 23/00; B65G 59/02; B65H 3/00
(52) U.S. Cl. ............... 414/737; 414/744.2; 414/796.5; 198/471.1
(58) Field of Search ............... 414/737, 744.2, 414/744.3, 796.5, 796.9, 797, 797.3; 198/470.1, 471.1

(56) References Cited

U.S. PATENT DOCUMENTS

| | | | |
|---|---|---|---|
| 3,385,595 A | 5/1968 | Benatar et al. | |
| 5,052,884 A | * 10/1991 | Igari | 414/744.2 |
| 5,222,854 A | * 6/1993 | Blatt et al. | 414/737 |
| 5,470,195 A | 11/1995 | Blank et al. | |
| 6,558,109 B2 | * 5/2003 | Gibbel | 414/797 |

FOREIGN PATENT DOCUMENTS

| | | |
|---|---|---|
| CH | 687 255 A5 | 10/1996 |
| DE | 297 03 020 U1 | 5/1997 |
| EP | 0 860 259 | 8/1998 |

* cited by examiner

Primary Examiner—Gene O Crawford
(74) Attorney, Agent, or Firm—William J. Sapone; Coleman Sudol Sapone, P.C.

(57) ABSTRACT

According to the method, single compact discs (1) are removed from a magazine (10) by a pick up group (14) which is carried by a drum (13). The drum (13) rotates continuously on a vertical axis.

The pick up group (14) is operated to move in a combined translation motion along a vertical axis and along a circumference around the drum (13), so as to move in a direction opposite to the movement direction imposed by said drum (13), from a first remote position, which is situated forward with respect to a median plane (M), to a close disk taking position. The combined translation motion of the pick up group (14) is continued, so as to bring the removed compact disc (1) to a second remote position. The removed compact disc (1) is then transferred to a conveying line (5) by a corresponding combined translation motion of the pick up group (14) with respect to the movement direction imposed by the drum (13), from a remote forward position to a close position, in which the compact disc (1) is released.

22 Claims, 15 Drawing Sheets

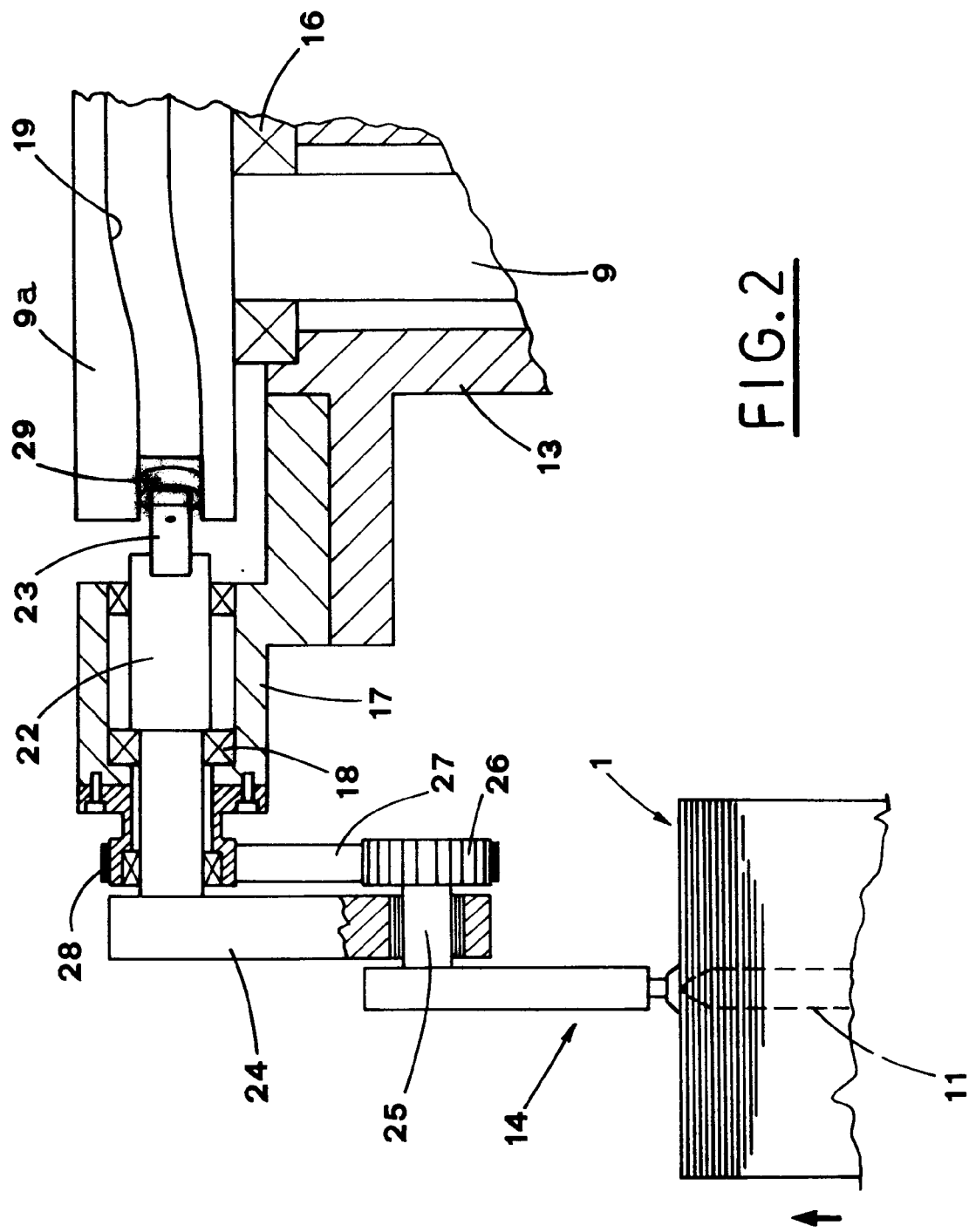

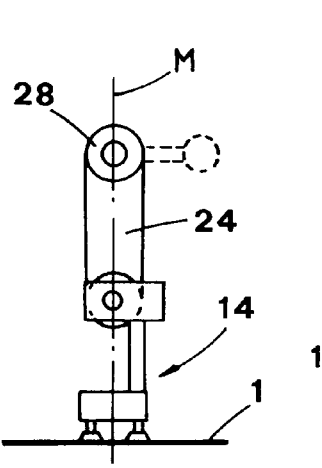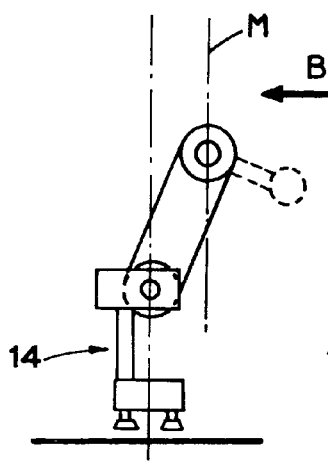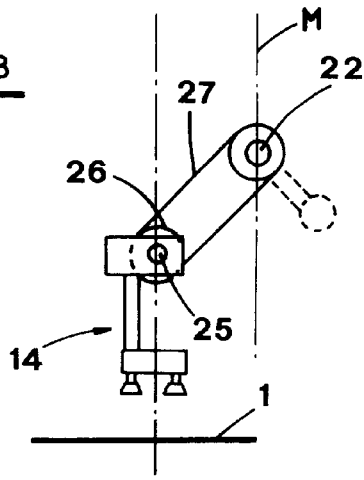
FIG.3c  FIG.3b  FIG.3a
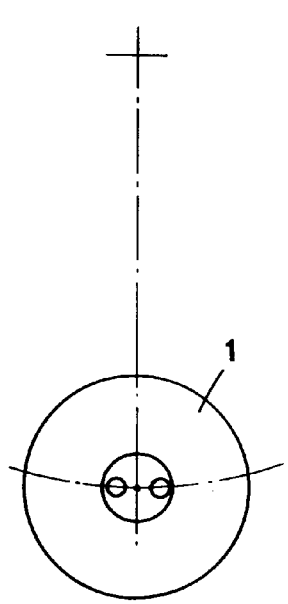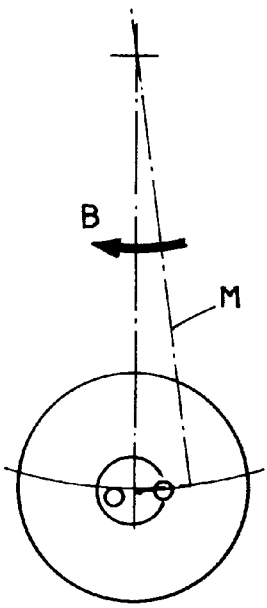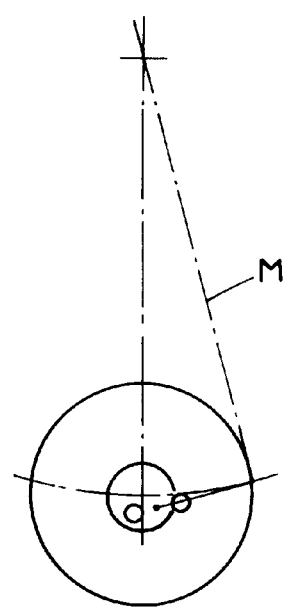
FIG.4c  FIG.4b  FIG.4a

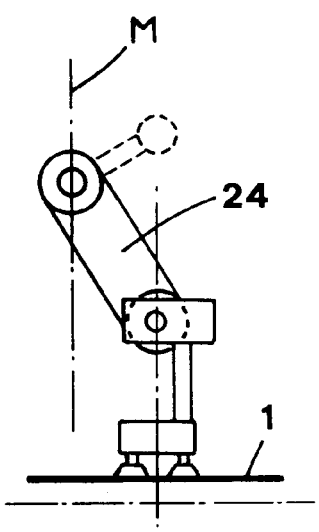 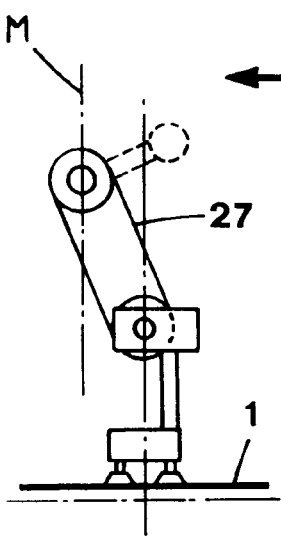 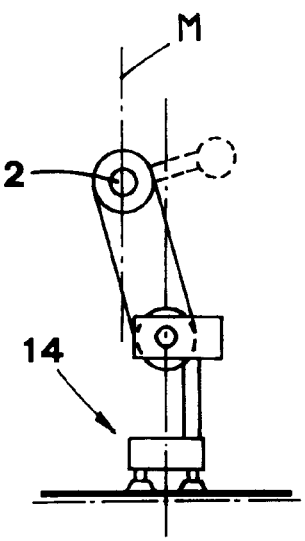
FIG.5c  FIG.5b  FIG.5a
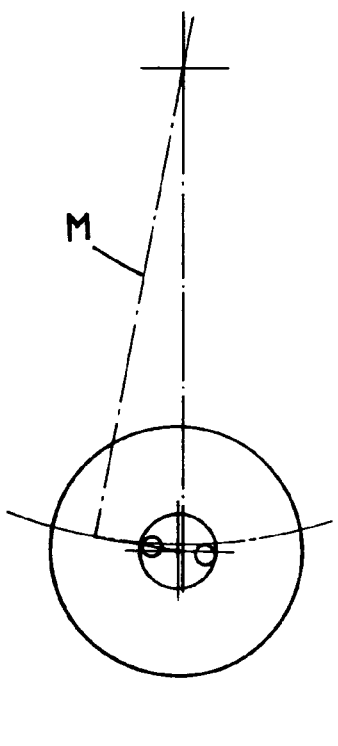 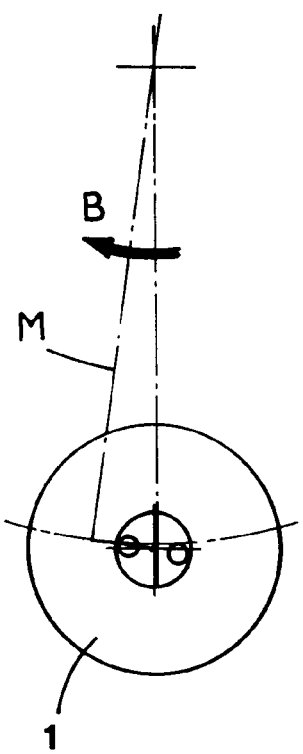 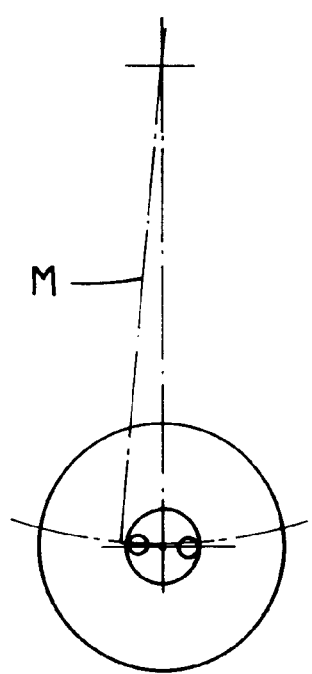
FIG.6c  FIG.6b  FIG.6a

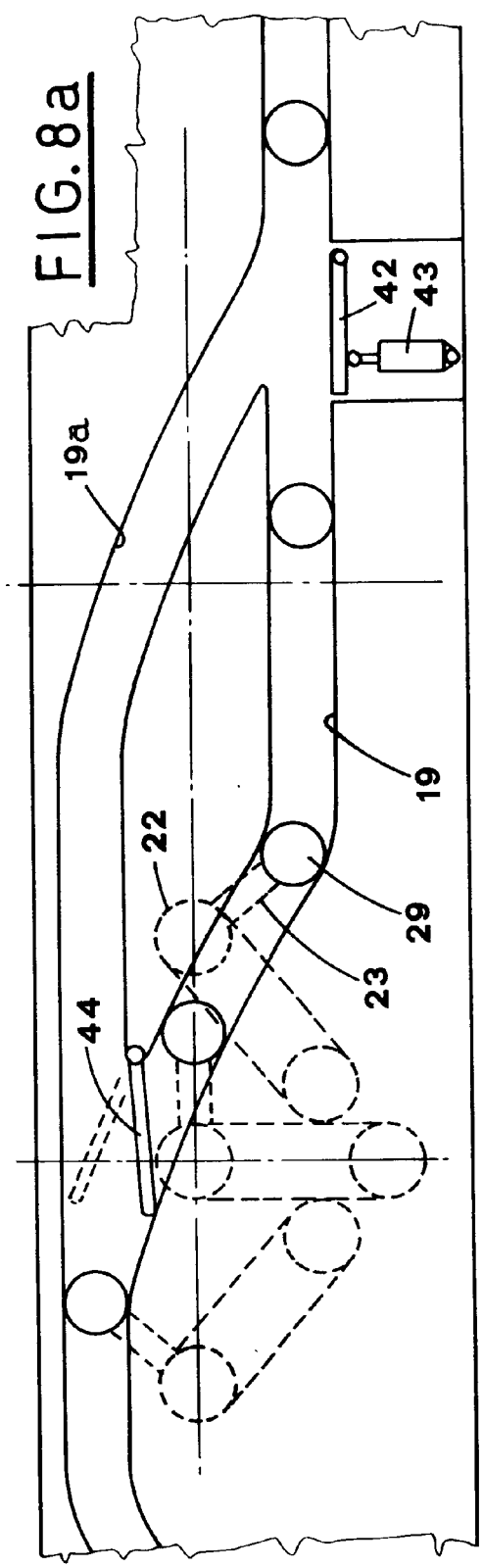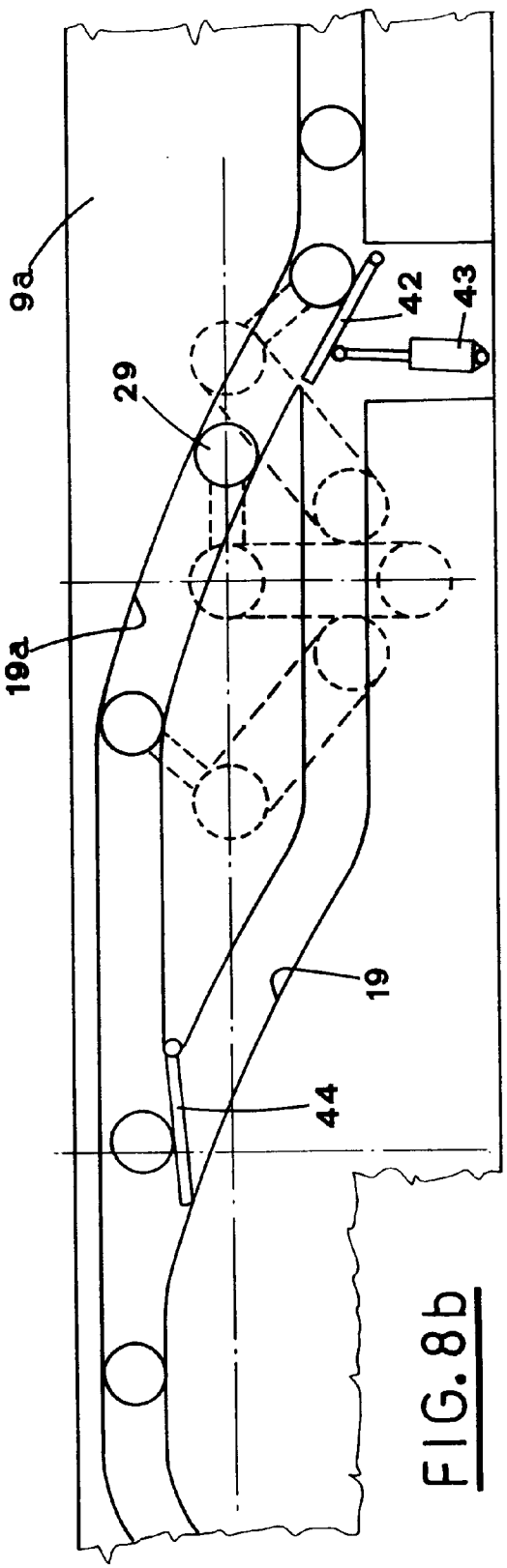

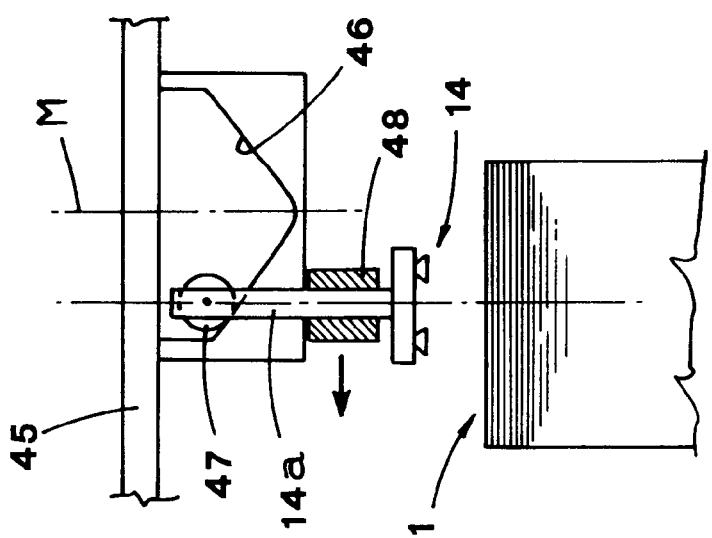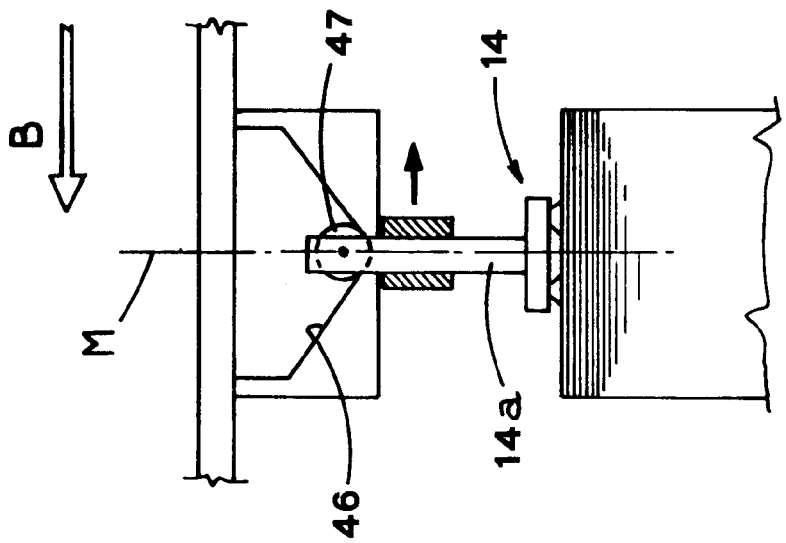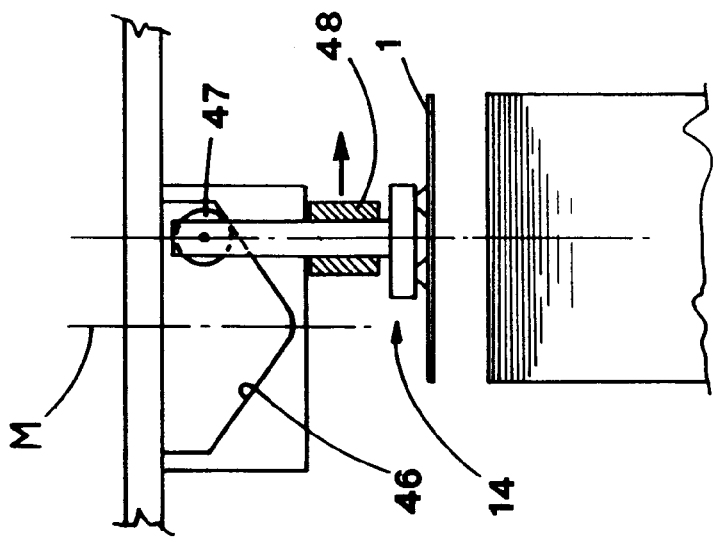

US 6,736,589 B2

METHOD AND DEVICE FOR TRANSFERRING COMPACT DISCS TO A PACKAGING LINE

FIELD OF THE INVENTION

The present invention relates to a method and a device for taking and transferring compact discs and similar articles to a packaging line in a compact discs packaging machine.

DESCRIPTION OF THE PRIOR ART

Compact discs and other similar articles, commonly used nowadays, are often packaged not only in rigid plastic containers, but also in envelopes made of plastic or other suitable material, e.g. card.

The envelopes are usually square, and have sides slightly bigger than the sides of the compact disc. One side of the envelope is usually open for introducing and extracting the compact disc.

The compact discs are packaged into the above envelopes by automatic machines working in stepwise fashion.

The operation speed of the packaging machines is usually limited and consequently, the productivity is not very high.

These limitations are caused by the necessity of avoiding damages to compact discs, e.g. due to rubbing and the like.

Actually, the compact discs are manipulated during different working steps of the packaging machines, both when the are taken from a magazine and when they are introduced into the envelopes.

During these manipulations, the active surface of the compact disc can be rubbed.

SUMMARY OF THE INVENTION

The object of the present invention is to resolve the above problem by proposing a method which allows to automatically take and transfer compact discs and other similar articles to a packaging line, assuring high operation speed and avoiding damages to the compact discs, so as to allow continuous operation of the compact discs packaging machine.

Another object of the present invention is to propose a machine, carrying out the above method, whose structure is simple and which is reliable and versatile.

The above objects are obtained according to the invention, by the proposed method for taking and transferring compact discs and other similar articles to a packaging line in a compact discs packaging machine, which is characterized in that it includes:

removing single compact discs from a magazine, where said compact discs are piled up, by means of a pick up group which is carried by a drum of a placing device, rotating continuously on its axis, with said pick up group being operated so as to perform a combined translation motions away from and towards said pile of compact discs and along a circumference around said drum, so as to move in a direction opposite to the movement direction imposed by said drum, from a first remote position, which is situated forward with respect to a median plane, to a close taking position, close to a compact disc to be removed from said magazine;

continuing said combined translation movement of said pick up group with respect to the movement direction imposed by said drum, so as to bring the removed compact disc to a second remote position, situated rearward with respect to said median plane;

transferring said removed compact disc to a packaging line by means of a combined translating movement of said pick up group with respect to the movement direction imposed by said drum, from a remote position situated forward to a close position, in which said compact disc is released.

BRIEF DESCRIPTION OF THE DRAWINGS

The characteristic features of the invention will become evident from the detailed description of a preferred embodiment of the device for taking and transferring compact discs to a packaging line, with reference to the enclosed drawings, in which:

FIG. 2 is a vertical section view taken along the plan II—II of FIG. 1;

FIGS. 3a, 3b and 3c are lateral views of the above mentioned pick up group in subsequent moments of the compact discs taking step;

FIGS. 4a, 4b and 4c are plan views corresponding to the just mentioned ones;

FIGS. 5a, 5b, and 5c are lateral views of the above mentioned pick up group in subsequent moments of moving away the taken compact disc;

FIGS. 6a, 6b and 6c are corresponding plan views of the above mentioned pick up group in subsequent moments of moving away the taken compact disc;

FIGS. 8a and 8b are lateral views of an enlarged particular of the means operating the pick up group of the proposed device;

FIGS. 9a, 9b and 9c are lateral views of a different embodiment of the means operating the pick up group, in subsequent moments of taking a compact disc;

BEST MODES OF CARRYING OUT THE INVENTION

Figure 1:
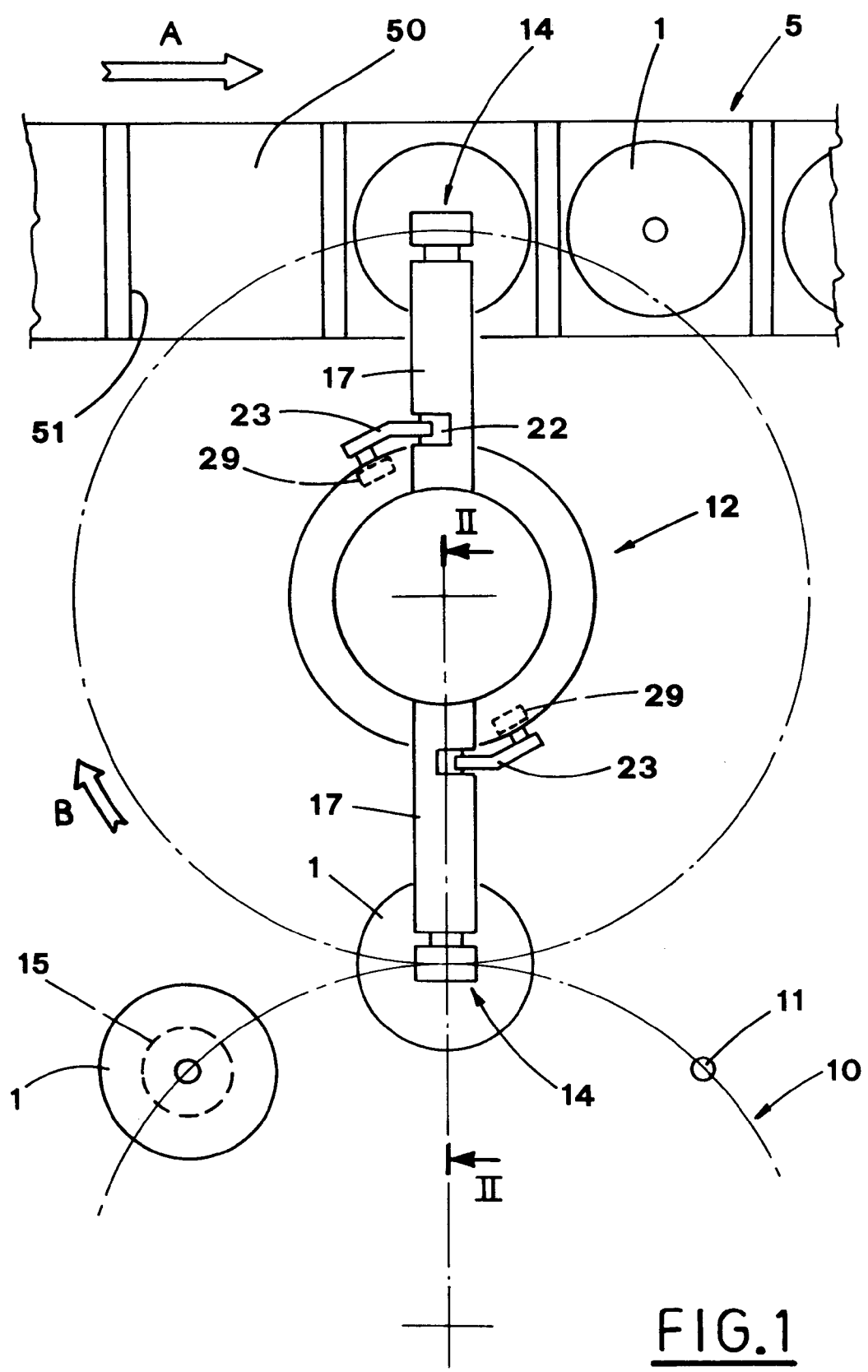
FIG. 1 is a schematic plan view of the device for taking and transferring compact discs to a packaging line, according to a first embodiment.

With particular reference to FIGS. 1 and 2, and to a first embodiment of the invention, reference numeral 1 indicates compact discs to be packaged into relative envelopes.

The compact discs 1 to be introduced into the envelopes are taken from a carrousel magazine 10, rotating stepwise on a vertical axis, which is suitably oriented.

The compact discs 1 are piled up on loading members 15, which are carried on the edge of the carrousel magazine 10 and are equipped with a guiding shaft 11.

In the example shown in FIG. 1, the above mentioned rotation axis is parallel to the axis of the compact discs pile, and in particular it is substantially vertical.

The carrousel magazine 10 supplies a device 12 for taking and placing compact discs in an ordered way, onto a conveying line 5, which is operated to move continuously in direction indicated with the arrow A.

The conveying line 5 is situated beside a corresponding line for conveying envelopes, not shown, and moves synchronously therewith, in the same direction and with the same speed.

The two conveying lines form the packaging line of the machine.

The conveying line 5 includes conveying means 50, e.g. chain, to which a series of box holders 51 are fastened, for receiving single compact discs 1 and introducing the compact discs into relative envelopes.

The compact discs placing device 12 includes a drum 13 rotating on an axis X, which is vertical in the present embodiment.

The drum 13 supports, along its edge, a plurality of suction cups pick up groups 14, diametrically opposite to one another, which are aimed at taking single compact discs 1 and at transferring them to the conveying line 5.

In the shown example there are two suction cups pick up groups 14.

The drum 13 is driven into rotation in suitable step relation with the movement of the conveying line 5, in the direction indicated with the arrow B.

The drum 13 rotates, with interposition of suitable rolling members 16, on a cylindrical turret 9, which is fastened to the machine frame.

On its top, the turret 9 features a head 9a, whose edge forms a circular cam 19.

Each gripping group 14 is operated by relative operating means 20, in directions away from and towards the pile of compact discs, and along a circumference of the drum 13.

The operating means 20 include a rotating shaft 22, supported by rolling means 18 and carried by a corresponding cylindrical sleeve 17, which is integral with the drum 13.

The axes of the sleeve 17, and consequently, also of the shaft 22 are aligned radially with the drum 13.

A transverse arm 24 is fastened to each shaft 22, at its end turned away from the placing device 12, so as to support the respective pick up group 14. The pick up group can therefore oscillate due to rotation of the shaft.

Actually, the pick up group 14 is fastened to a spindle 25, which passes through the transverse arm 24 and rotates freely with its axis radial to the drum 13.

The spindle 25 carries, keyed thereto, a toothed wheel 26.

A toothed belt 27 is set around the toothed wheel 26.

The toothed belt 27 engages with a pulley 28, which is fastened to the front part of the sleeve 17.

The transmission ratio between the toothed wheel 26 and the pulley 28 equals 1.

When the drum 13 of the placing device 12 rotates on the stationary turret 9, the circular cam 19 determines the rotation of the shaft 22 inside the sleeve 17, because of the lever 23 carrying the roller 29, which follows the cam 19.

In its turn, the sleeve 17 follows the drum 13 rotation.

The rotation of the shaft 22 causes a corresponding rotation of the transverse arm 24, which carries the oscillating pick up group 14, so as to move the pick up group 14 between a forward moved position and a rearward moved position with respect to the median plane passing through the shaft 22 axis.

Obviously, the rotation of the arm 24 in the forward moved and rearward moved positions causes also a movement, which moves the pick up group 14 away with respect to the forward position in correspondence to the above mentioned median plane.

At the same time, the rotation of the transverse arm 24 determines the counter-rotation of the pick up group 14, whose spindle 25 is integral with the toothed wheel 26.

The toothed wheel 26 is rotated by the toothed belt 27, which is set around the stationary pulley 28.

The counter-rotation imposed to the spindle 25 is such as to maintain substantially constant the orientation of the pick up group 14, during the alternated movements between the forward and rearward positions.

Practically, the pick up group 14 is driven to move in a combined translation way along directions away from and towards the above mentioned pile of compact discs, and along a circumference of the drum 13.

During removal of the compact discs 1 from the magazine 10, the pick up group 14 moves, due to the combined translation movement, in the direction opposite to the movement direction imposed by the drum 13, beginning from a first remote position, moved forward with respect to the median plane, seen if FIG. 3a.

Thus, the pick up group 14 moves toward the pile of compact discs (see FIG. 3b) and moves closer to the median plane, indicated with M for sake of clarity, until it reaches a close, compact discs removing position, near to the compact discs to be taken (FIG. 3c).

In this close, removing position, the pick up group 14 is aligned with the median plane M. It is to be pointed out that the movement of the pick up group 14 in the direction opposite to the direction imposed by the drum 13 determines a reduction of the relative peripheral speed of the pick up group 14 with respect to the compact disc 1.

In the picking up point, peripheral speed is equal to zero, which facilitates picking up the compact disc 1.

The combined translation movement of the pick up group 14 with respect to the movement direction imposed by the drum 13, continues after the compact disc has been picked up, so that the removed compact disc can be brought to a second remote position, moved rearward with respect to the median plane M, as shown in sequence in FIGS. 5a, 5b and 5c.

Then, the pick up group 14 reverses its movement direction with respect to the movement direction imposed by the drum 13, i.e. it moves with combined translation motion in the same direction as the one imposed by the drum 13, so as to come back to the initial position, remote and fore with respect to the median plane M.

From this position, the pick up group 14 reverses again its movement direction and starts a new close-moving cycle, so as to transfer the compact discs 1 to the conveying line 5.

In the illustrated case, the placing device 12 is equipped with two pick up groups 14 carried by the drum 13, arranged diametrically opposite to each other, so that while one pick up group 14 is transferring the compact disc to the conveying line 5, the other is taking a next compact disc.

Obviously, the proposed device can be equipped with more than two pick up groups 14, arranged along the circumference of the drum 13, at distances defined by the drum 13.

Figure 7:
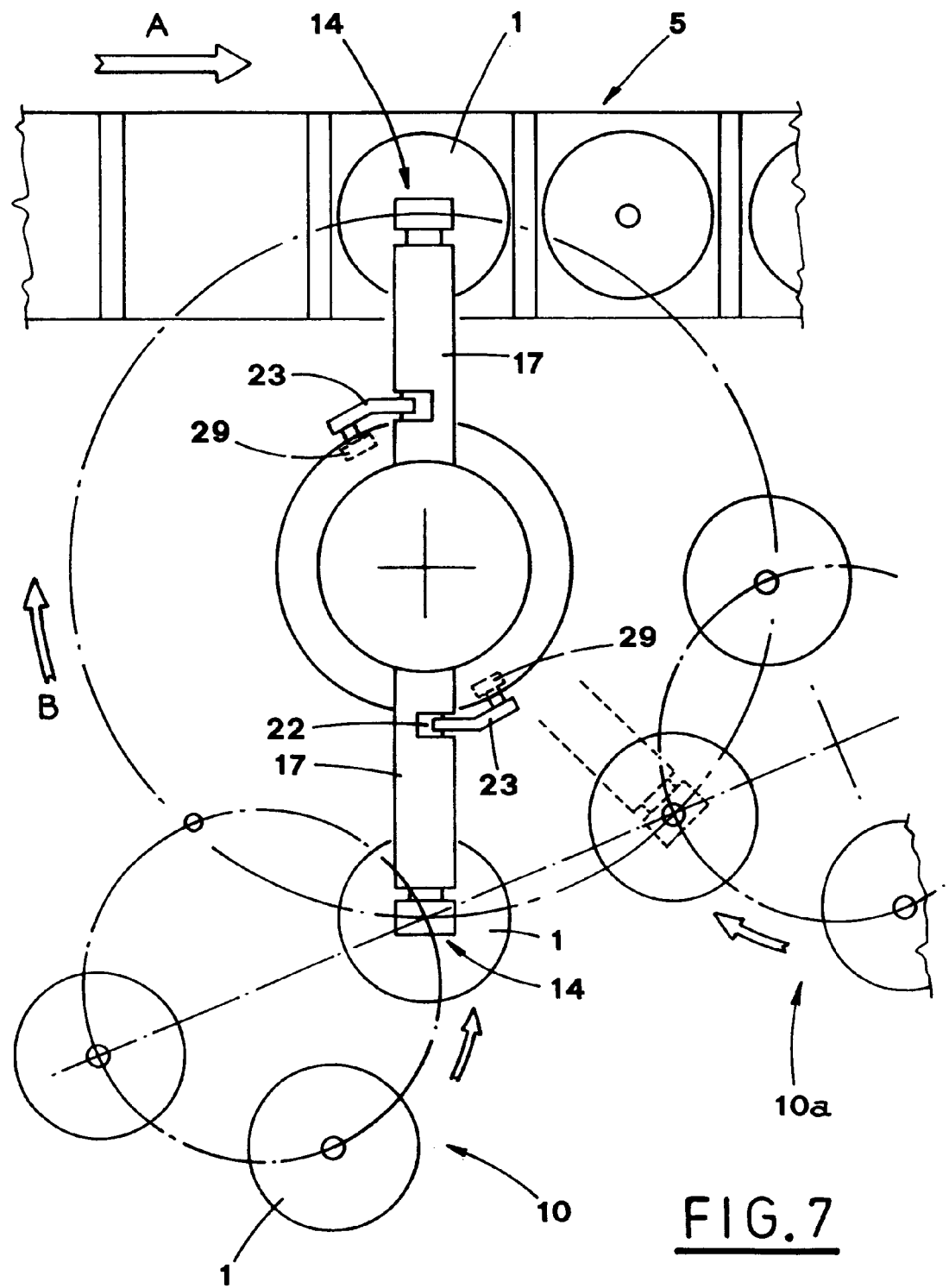
FIG. 7 is a schematic plan view of a second embodiment of the proposed device.

FIGS. 7 and 8a, 8b show a particular embodiment of the proposed device, according to which the pick up groups 14 are aimed at taking the compact discs 1 from two different magazines 10, 10a, so as to assure the continuity of the compact discs feeding.

For this purpose, the circular cam 19 of the turret 9 has an additional branch 19a in the region of the compact discs picking up area. The additional branch 19a anticipates the rotation of the shaft 22 of pick up group 14, which engages the cam with the roller 29.

During the compact discs 1 removal from the first magazine 10, the roller 29 follows a first section of the cam 19, which operates the pick up group 14 as previously described (FIG. 8a).

When the first magazine 10 is run out of compact discs 1, an actuator 43 operates a baffle 42, which makes the roller 29 pass to the additional branch 19a of the cam (FIG. 8b).

Thus, the operation of the pick up group 14 is anticipated, so that it can pick up the compact discs 1 from the second magazine 10a, while the first magazine 10 is being supplied with compact discs 1.

The roller 29, situated on the end of the additional branch 19a, moves back to the first arm of the cam 19, due to an oscillating plate 44.

The oscillating plate 44 rises freely when the roller 29 follows the first section of the cam 19.

FIGS. 9a, 9b, 9c and 10a, 10b, 10c show a second embodiment of the means operating the combined translation motion of the pick up groups 14 with respect to the drum 13.

According to this embodiment, the drum 13 features a circular head 45, which carries, along its edge in correspondence to each pick up group 14, a "V"-like cam 46, engaged by a roller 47 joined to a shaft 14a of the pick up group 14.

The shaft 14a slides inside a tube 48 in directions away from and towards the pile of compact discs.

The tube 48 is formed at the end of a lever 49, which is situated radially to the drum 13 and is moved angularly with respect thereto by suitable actuators, not shown.

Figure 10A:
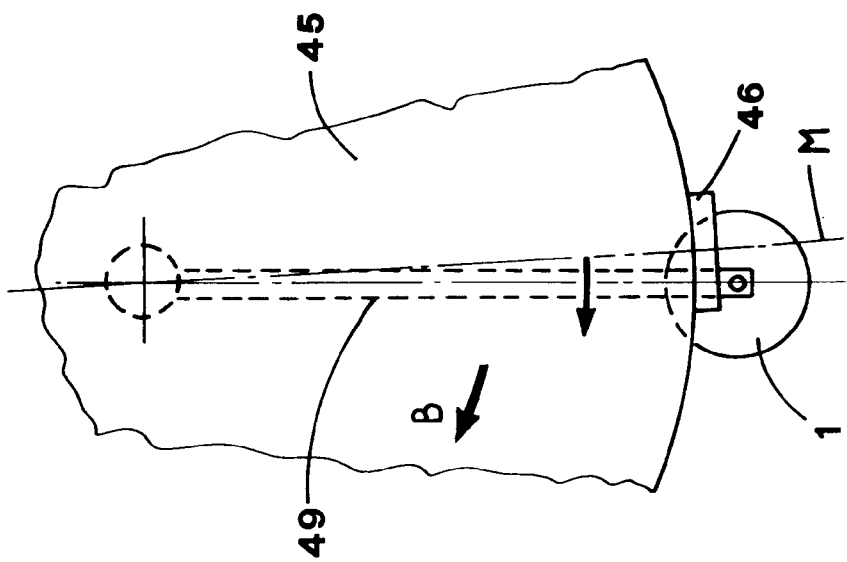
FIGS. 10a, 10b and 10c are corresponding plan views of the different embodiment of the means operating the pick up group, in subsequent moments of taking a compact disc.
Figure 10B:
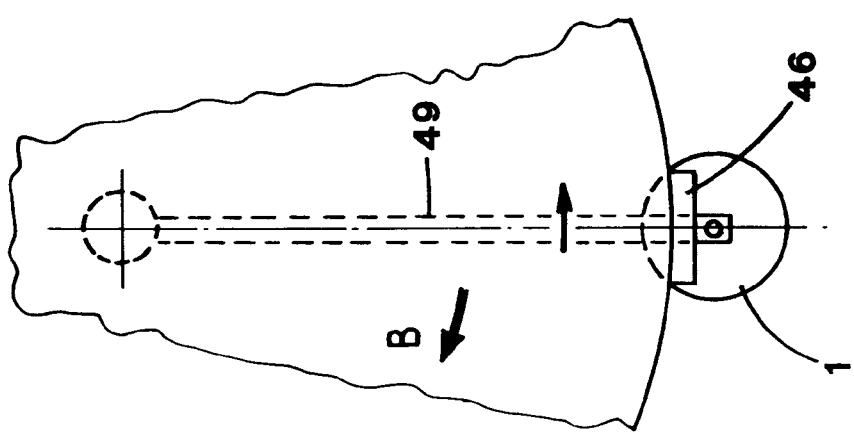

Also in this case, in order to remove the compact discs 1, the pick up group 14 is brought, by the combined translation movements away from and towards the compact discs pile, first to an initial remote and forward position, due to the action of the cam 46 and along a circumference of the drum 13, due to the action of the lever 49 (FIGS. 9a and 10a).

The pick up group 14 is then moved, by the rotation of the lever 49, in the direction opposite with respect to the movement direction imposed by the drum 13, until it reaches a close, compact discs taking position, in which it is aligned with the median plane M.

Figure 10C:
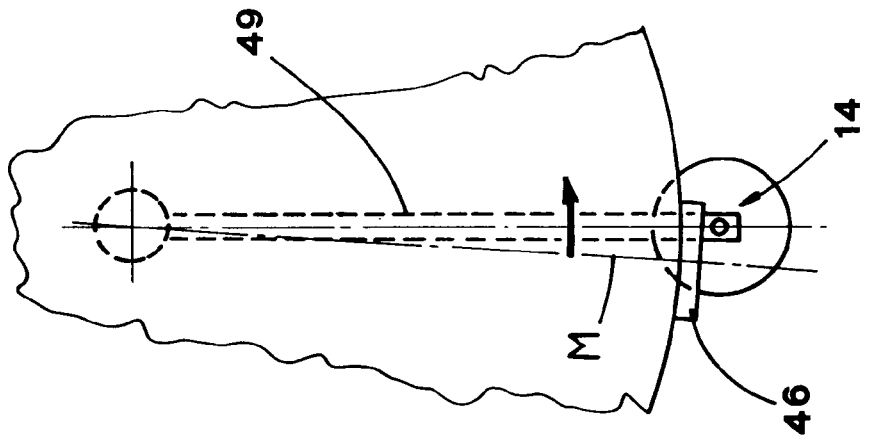

The combined translation movement of the pick up group 14 with respect to the movement direction imposed by the drum 13, continues, so that the removed compact disc can be brought to a second remote position (FIGS. 9c and 10c).

In similar way, the removed compact disc 1 is the transferred to the conveying line 5.

Figure 11:
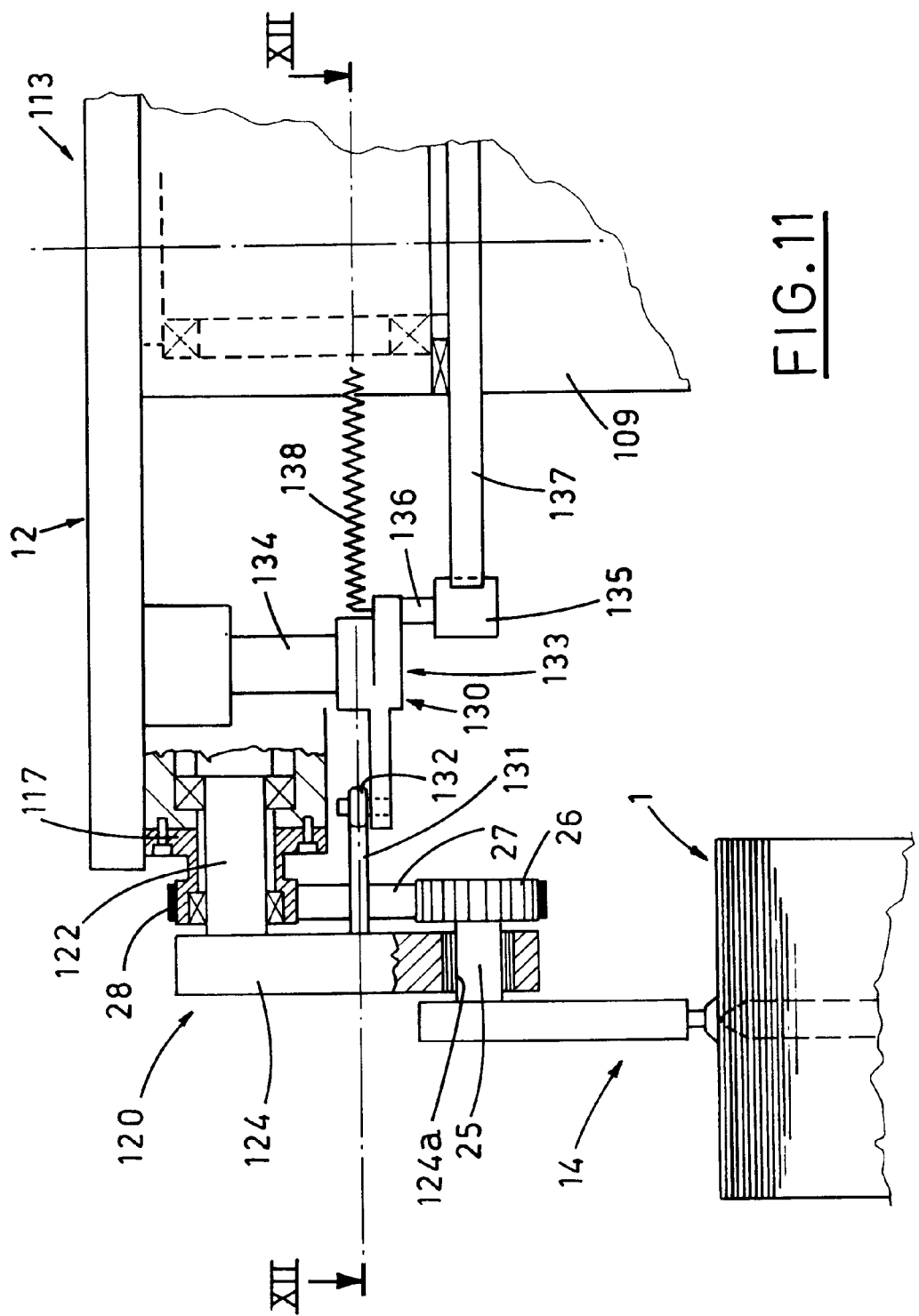
FIG. 11 is lateral view of a third embodiment of the proposed device.
Figure 12:
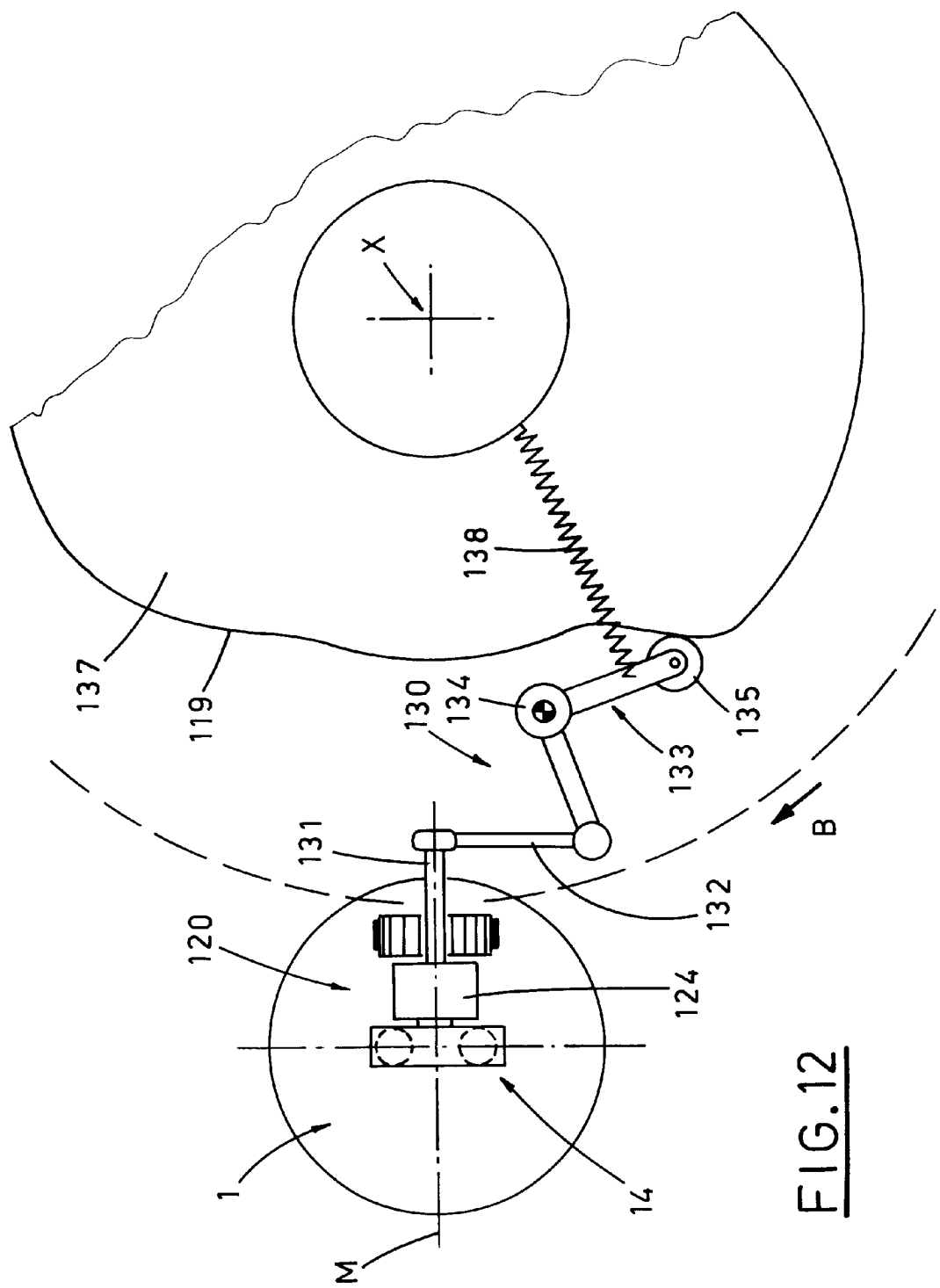
FIG. 12 is a schematic plan view of the device of FIG. 11.

FIGS. 11 and 12 show a third embodiment of the placing device 12.

According to this embodiment, a drum 113 rotates on a corresponding turret 109.

Each pick up group 14 is equipped with operating means 120, which it to the same combined translation motion in directions away from and towards the compact discs pile, and along the circumference of the drum 113.

In particular, the operating means 120 include a shaft 122, carried idle on its axis by a tube 117, which is integral with the drum 113 and radial thereto.

The outer end of the shaft 122 supports a transverse arm 124, whose other end features a through hole 124a.

Like in the first embodiment of the present invention, a spindle 25 passes through the hole 124a.

The spindle 25 carries, on its outer end the pick up group 14, and on its inner end, the toothed wheel 26.

Likewise, the toothed belt 27 connects the pulley 28 with the toothed wheel 26, which are aimed at maintaining substantially constant the translation direction of the pick up group 14.

A linking 130 is fastened with its outer end to the transverse arm 124, in a position intermediate and inner with respect to the drum 113.

The linking 130 drives the transverse arm to oscillate in phase relation with the angular position of the drum 113.

The linking 130 includes a first arm 131, fastened to the transverse arm 124 and extending substantially radially, and a second arm 132, substantially orthogonal to the first one and hinged to its free end, on an axis coincident with the longitudinal axis of the first arm 131.

The free end of the second arm 132 is hinged, on an axis orthogonal to its longitudinal axis, to a head of an angle lever 133.

The lever 133 is pivoted on a pin 134, whose axis lays in the longitudinal axis X of the drum 113.

A cylindrical roller 135 is idling at the other end of the lever 133, on a spindle 136, whose axis substantially lays on the axis X of the drum 113.

The cylindrical roller 135 follows a cam 119, made on the outer edge of a shaped plate 137, which is keyed coaxial with the turret 9, under the drum 113.

The cylindrical roller 135 is kept leaning against the cam 119 by a pulling spring 138, which extends radially between the lever 133 with angled arms, near the roller 135 attachment, and the drum 113.

When the drum 113 rotates, the cam 119 drives the transverse arm 124, through the linking 130, to oscillate periodically.

The periodical oscillation of the transverse arm 124 corresponds to a periodical movement of the pick up group 14 between a fore position and a rear position with respect to the vertical median plane passing through the axis of the shaft 122, and a corresponding translation from a first position remote from the compact discs pile to a close, compact disc removing position and then to a second remote position, in which the removed compact disc is transferred, as described previously, according to the first embodiment (FIGS. 3a, 3b, 3c and 5a, 5b, 5c).

In an exactly similar way, although independently, the compact disc 1 is released onto the conveying line 5.

Actually, the modality of the pick up group 14 movement depend on the shape of the cam 119.

Figure 12A:
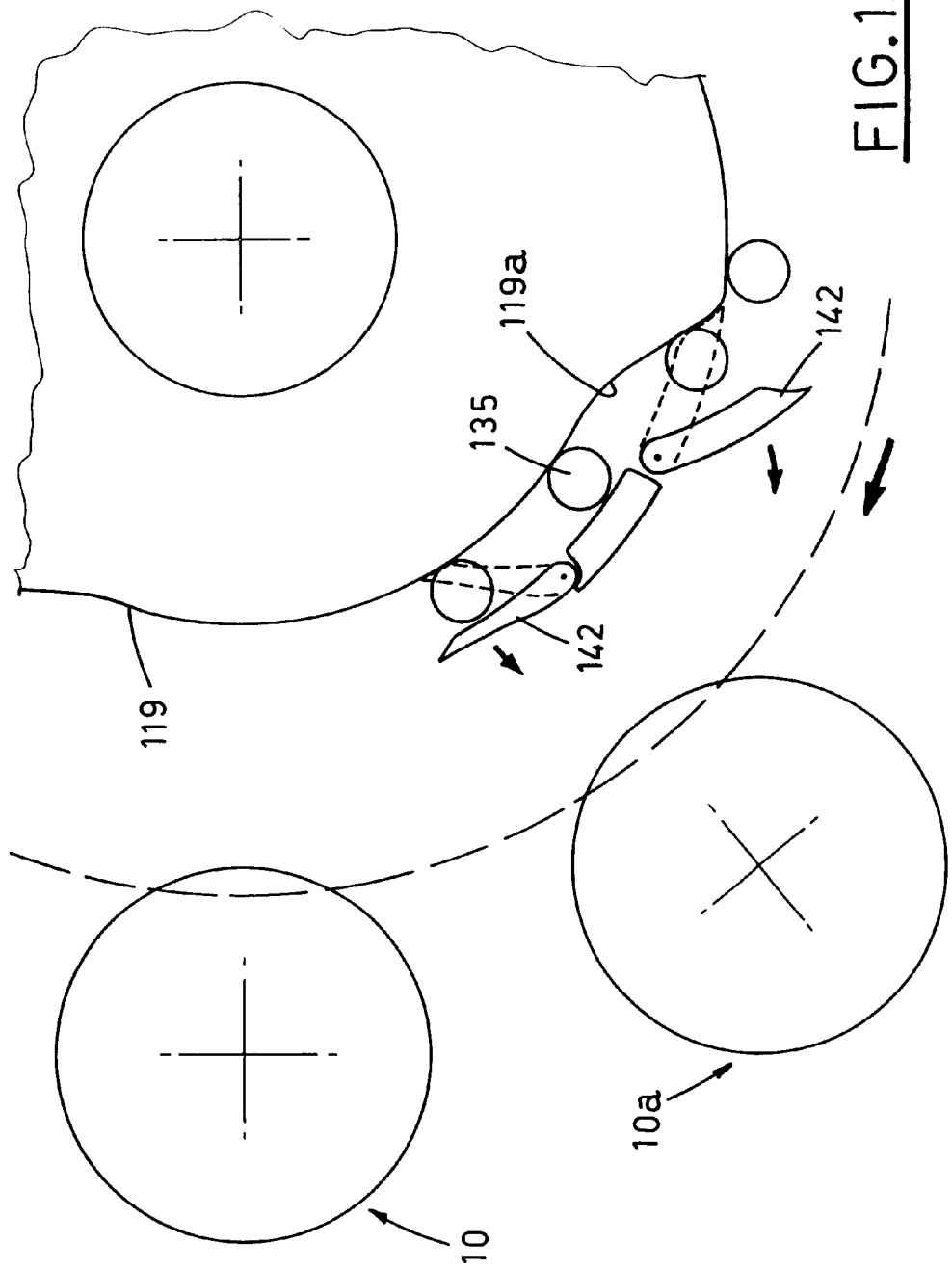
FIG. 12a is a schematic plan view of a variant of the device of FIG. 11.

According to a variant of the above described embodiment, shown in FIG. 12a, the circular cam 119 has an additional branch 119a, disposed in the region of the area where the compact discs 1 are removed. The additional branch 119a anticipates the operation of the shaft 122 oscillation and which engages the circular cam 119 with a relative roller 135.

When the first magazine 10 is run out of the compact discs 1, a baffle 142 is operated, so as to pass the roller 135 to the cam additional branch 119a.

According to a fourth embodiment of the taking device (see FIGS. 13a, 13b, 13c, 14), the means 220 operating the pick up group 14 are obtained in yet another way.

The pick up group 14 includes a shaft 250, which in the shown example, extends substantially vertically.

The operating means 220 include a connecting rod 251, to which the shaft 250 of the pick up group 14 is pivoted, at the end opposite to the end used to take the compact discs 1.

The connecting rod 251 is freely pivoted on a block 253, which is integral with the drum 13, not shown for sake of simplicity.

The shaft 250 slides through a hole 255 of an arm 254 supporting the pick up group 14.

In the upper part of its inner surface 254a, the arm 254 carries a pair of guiding rollers 256a, 256b, idle on their axes and engaging with a circumferential groove 257, made in a collar 258, which is integral with the drum 13.

The inner surface of the arm 254 carries also, fastened thereto, an end of a linking 260, formed substantially like the one described in the third embodiment of the device.

Likewise, a cam following roller 261 and a corresponding cam 262 are made as described in the third embodiment.

The above described operating means 220 operate the pick up group 14 to perform a combined translation motions away from and towards the pile of compact discs and along a circumference of the drum 13.

In particular, during the drum 13 rotation, the shape of the drum 262 determines, through the roller 261 and the linking 260, a first translation of the block 254, guided by the groove 257, in the direction B of the drum 13 rotation, which causes moving of the pick up group 14 to a first position fore with respect to the median plane M.

Figure 13A:
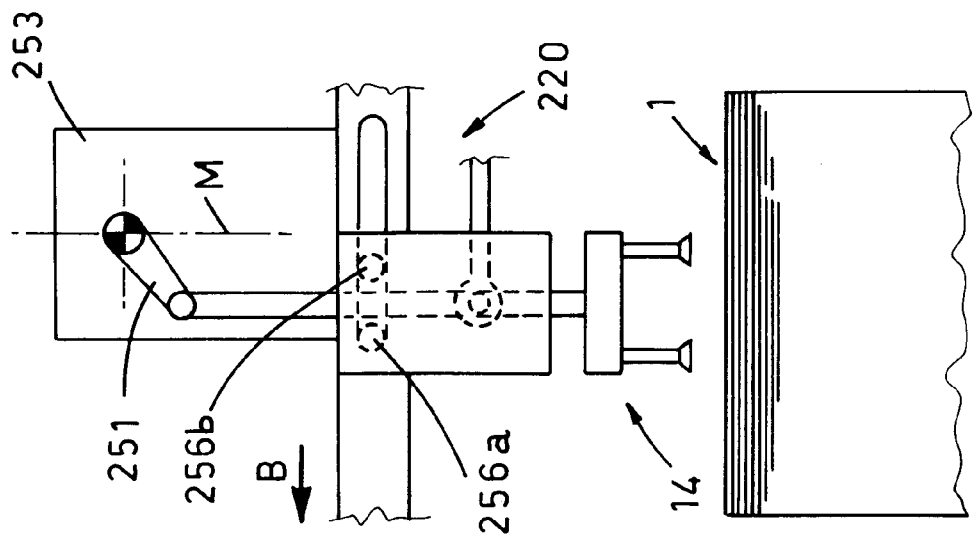
FIGS. 13a, 13b and 13c are schematic lateral views of a fourth embodiment of the proposed device, in different working steps.

At the same time, the pick up group 14, driven to translate in directions away from and towards the pile of compact discs, by the connecting rod 251 and engagement with the hole 255 of the block 254, is brought to a first position, at a certain distance over the pile of compact discs (FIG. 13a).

Figure 13B:
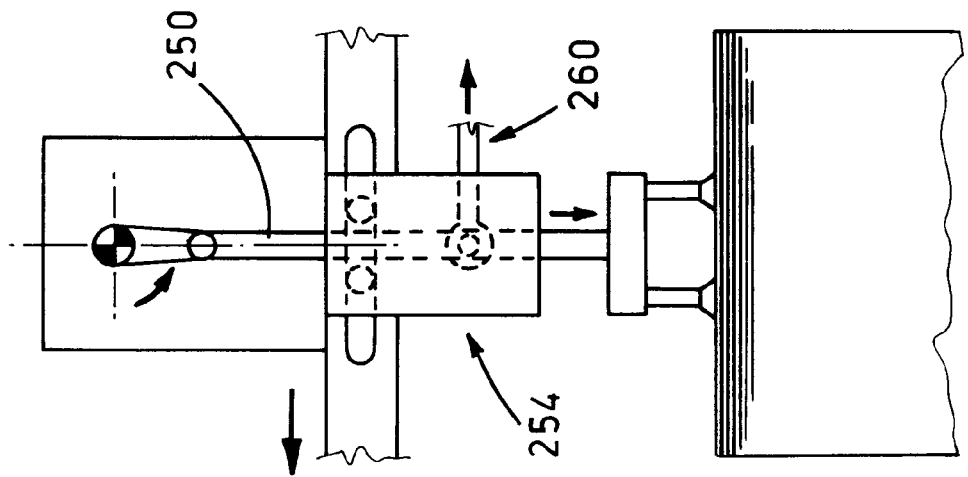

Subsequently, the pick up group 14 is pulled in the direction opposite to the above mentioned direction B and thus moves close to the pile of compact discs 1, until it reaches a closer, compact disc taking position (FIG. 13b).

Figure 13C:
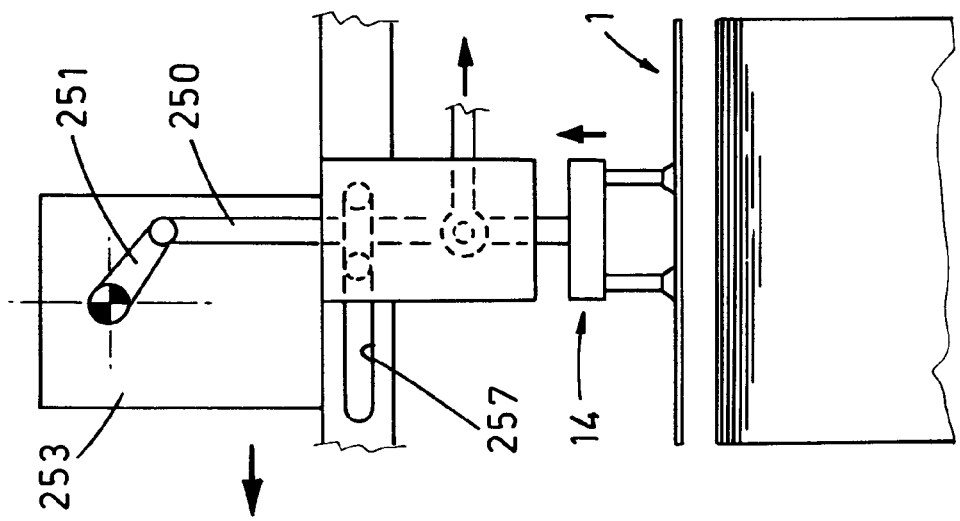
Figure 14:
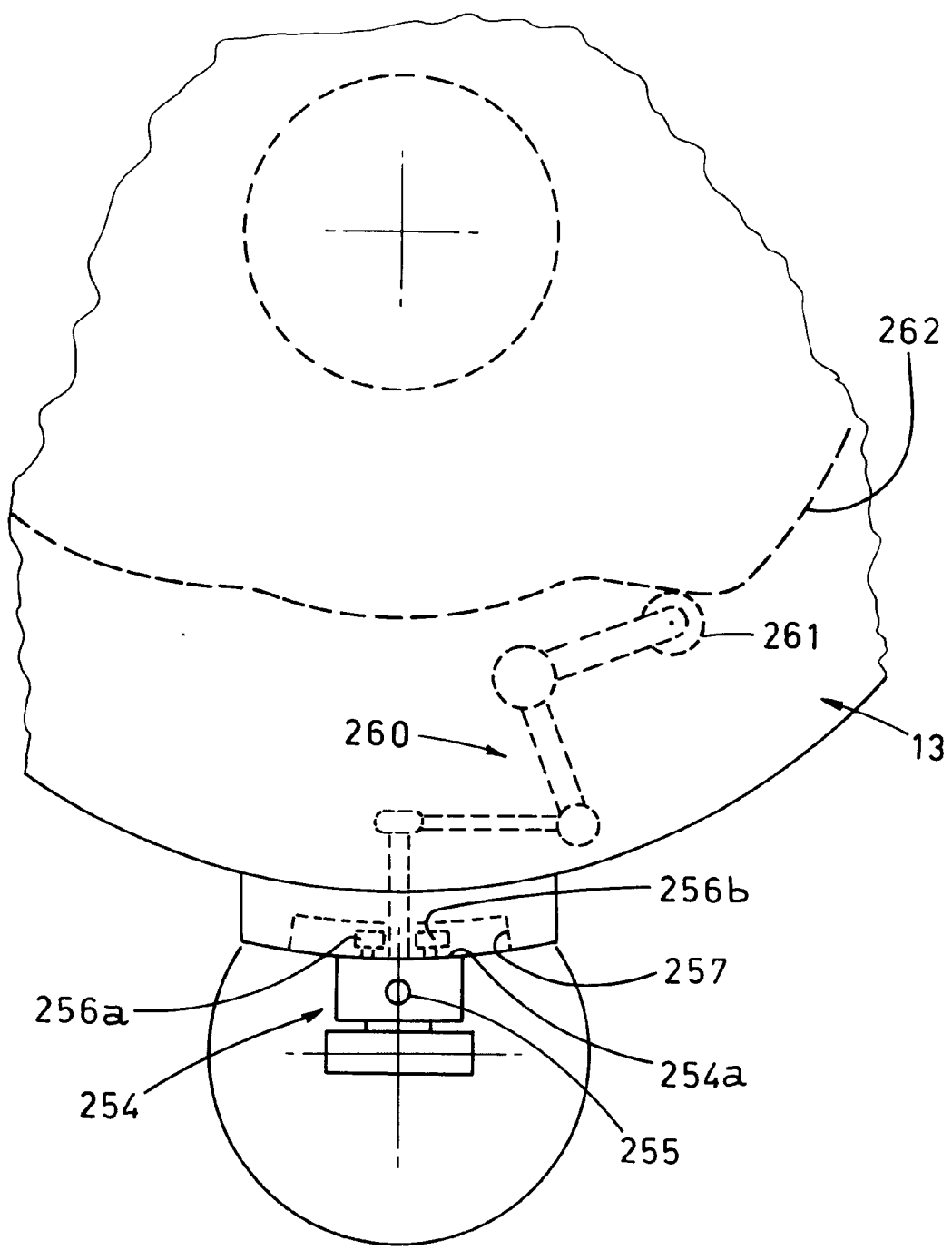
FIG. 14 is a plan schematic view of the device of FIGS. 13a, 13b, 13c.

The pick up group 14 continues to be pulled in the direction opposite to the direction B, and consequently is moved away from the pile of the compact discs 1, until it reaches a remote transport position (FIG. 13c).

Figure 15:
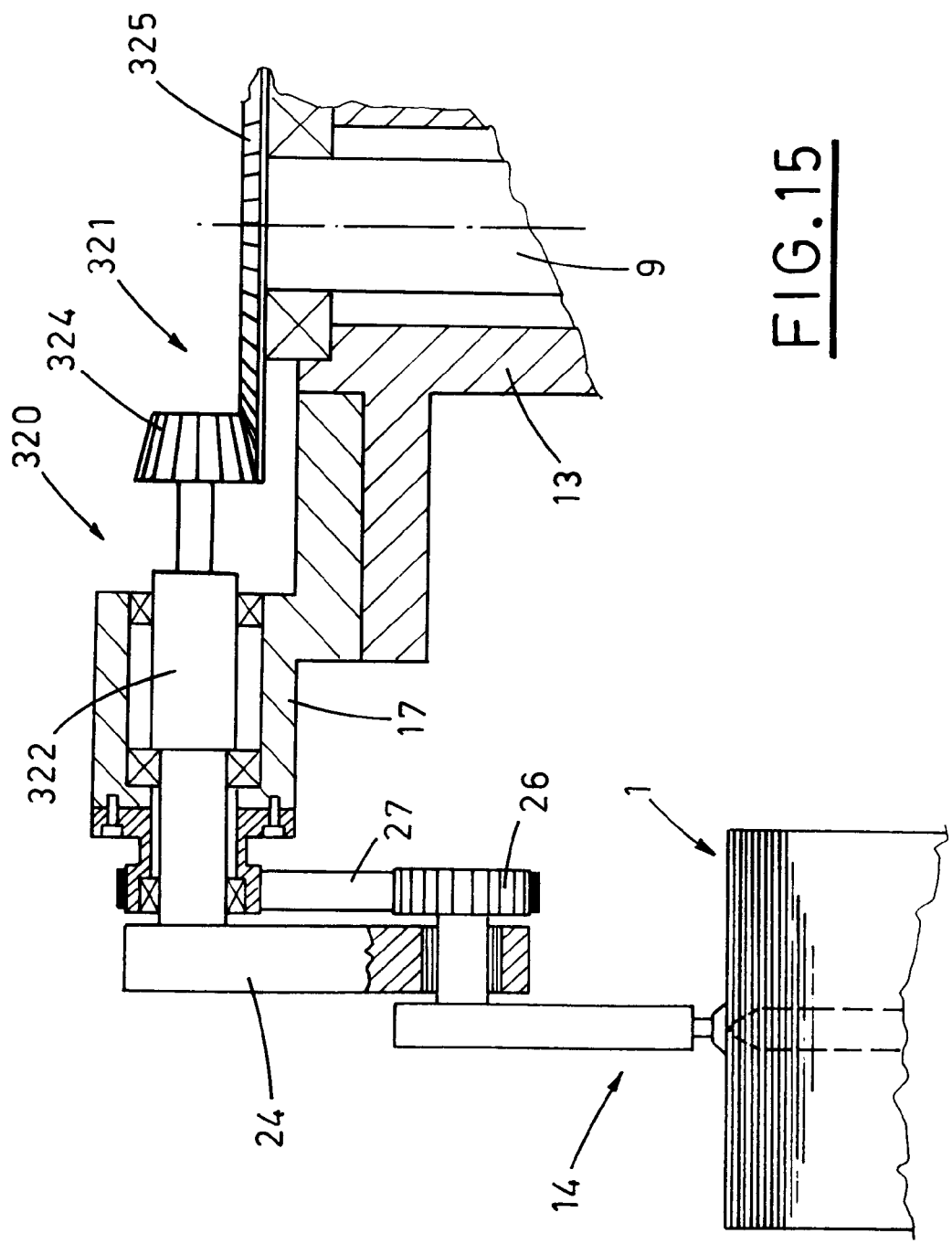
FIG. 15 is a lateral view of fifth embodiment of the proposed device.

According to a fifth embodiment (see FIGS. 15 and 16), the taking device is includes means 320 operating the pick up group 14.

The operating means 320 include the arm 24, the radial spindle 25 and the group including the toothed wheel 26, the toothed belt 27 and the pulley 28, which are substantially identical with the ones described in the first embodiment.

Figure 16:
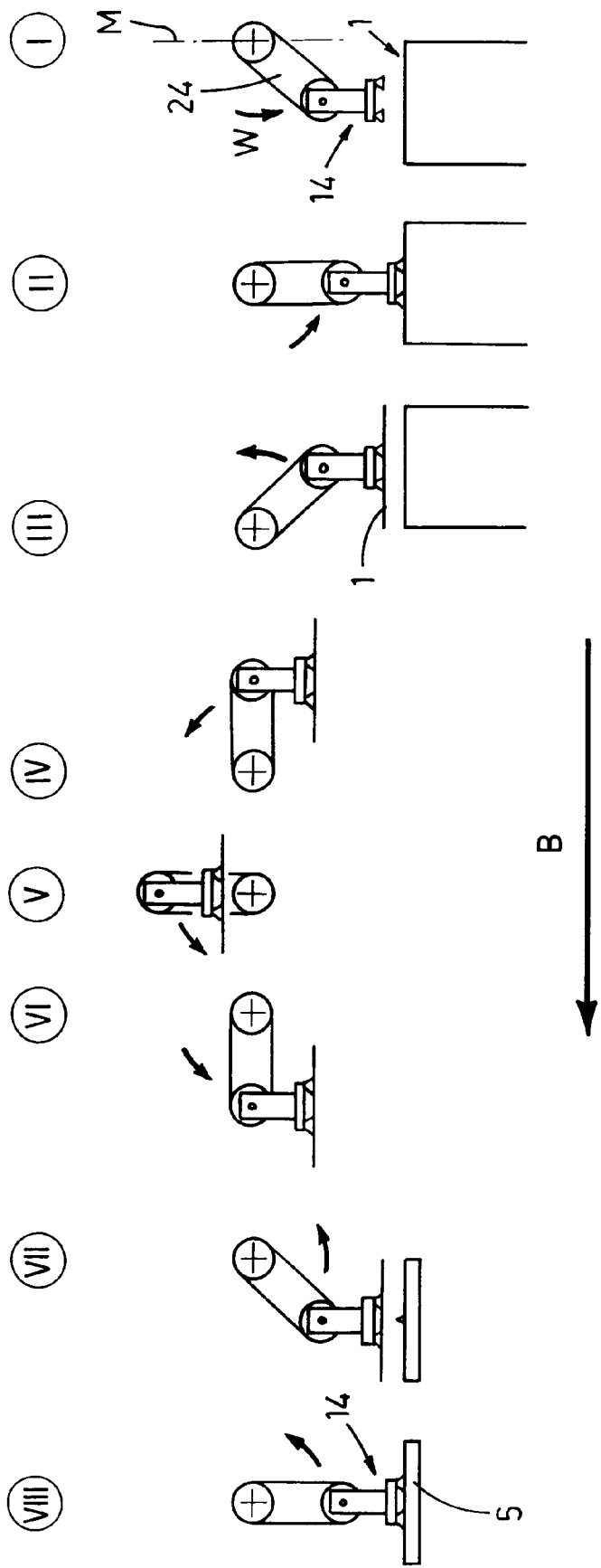
FIG. 16 is a schematic lateral view of a sequence of working steps of the device of FIG. 15.

In this case, the arm 24 is carried by gear means, which drive it to rotate continuously, on a plane substantially perpendicular to the above radial spindle 25 and in phase relation with the rotation of the drum 13, in the direction indicated with W in FIG. 16.

In particular, the gear means include bevel gear pair 321, joined to a shaft 322.

The shaft 322 is supported by a sleeve 17 and is rotated by suitable bearings 18.

The sleeve 17 is fastened to the edge of the drum 13, radially thereto.

The bevel gear pair 321 includes a first gear 324, keyed onto the free end of the shaft 322 and in line therewith, and a second gear 325, keyed onto the head of the turret 9 supporting the drum 13 and in line with the turret 9.

During the rotation of the drum 13 in the direction B, the pick up group 14 is driven, by the rotation of the arm 24 and by the counter-rotation imposed by the toothed belt 27, to perform periodic movements (steps I–VII of FIG. 16) including moving closer to the pile of compact discs from a fore position with respect to the median plane M, in the direction opposite to the drum 13 rotation direction, reaching of a close position, in which a compact disc is removed, moving away from the pile with one compact disc gripped, and subsequently, reaching a second close position, in which the removed compact disc is released to the conveying line 5, when the arm 24 has completed a rotation cycle.

During all the working steps, the pick up group 14 orientation remains constant due to the combined action of the rotation imposed by the arm 24 and the counter-rotation imposed by the toothed belt 27.

The described method fulfills the object to automatically take and transfer compact discs to a packaging line, ensuring a high working speed and without damages to the compact discs.

This allows the machine for packaging compact discs to work continuously, which is obviously advantageous for productivity.

One of the characteristic features of the proposed method and device is the fact that during the picking up of the compact disc from the magazine, the picking up means including suction cups are substantially motionless with respect to the-compact disc to be removed from the magazine, which allows to avoid rubbing which could damage the compact discs quality.

It is to be pointed out that the proposed device operates the taking of the compact discs independently from the transferring of the compact discs to the packaging line.

It is also to be pointed out that the proposed method can be carried out by a simple device, which is reliable and versatile.

In practical use of the present invention, the materials, as well as the shape and the dimensions can change in relation to the needs.

What is claimed is:

1. A method for taking and transferring compact discs and the like to a packaging line in compact discs packaging machines, the method being characterized in that it includes:

removing single compact discs (1) from a magazine (10), where said compact discs are piled up, by means of a pick up group (14) which is carried by a drum (13,113) of a placing device (12), rotating continuously on its axis (X), with said pick up group (14) being operated so as to perform a combined translation motions away from and towards said pile of compact discs, in the direction of said axis (X) of the drum, and along a circumference around said drum (13), so as to move in a direction opposite to the movement direction (B) imposed by said drum (13), from a first remote position, which is situated forward with respect to a median plane (M) including said axis (X) of the drum, to a close taking position, close to a compact disc (1) to be removed from said magazine (10);

continuing said combined translation movement of said pick up group (14) with respect to the movement direction (B) imposed by said drum (13,113), so as to bring the removed compact disc (1) to a second remote position, situated rearward with respect to said median plane (M);

transferring said removed compact disc (1) to a packaging line (5) by means of a combined translating movement of said pick up group (14) with respect to the movement direction (B) imposed by said drum (13,113), from a remote position situated forward to a close position, in which said compact disc (1) is released.

2. A device for taking and transferring compact discs and the like to a packaging line in compact discs packaging machines, said device being characterized in that it includes:

a drum (13,113) rotating continuously on its axis (X) and supporting on its edge at least one pick up group (14) for removing a single compact disc (1) from a magazine (10), where said compact discs are piled up, and subsequently release said compact disc (1) to a conveying line (5);

operating means (20,120,220,320), which operate said pick up group (14) to a combined translation motions away from and towards said pile of compact discs, along the direction of said axis (X) of the drum, and along a circumference around said drum (13,113), so as to move said pick up group (14) alternately in the same direction as, and against, the movement direction (B) imposed by said drum (13,113), between a first remote position, which is situated forward with respect to a median plane (M) including said axis (X) of the drum, a close position, in correspondence to said median plane (M), in which the compact discs are removed and released, and a second remote position, situated rearward with respect to said median plane (M).

3. A device, according to claim 2, wherein said drum (13) drives at least two pick up groups (14), diametrically opposite, so that one pick up group (14) is transferring a compact disc (1) to the conveying line (5), while the other is removing a next compact disc (1) from said magazine (10).

4. A device, according to claim 2, wherein said operating means (320) include an arm (24), which carries said pick up group (14) oscillating with respect to a spindle (25), radial to said drum (13), said arm being driven into continuous rotation by gear means, on a plane substantially perpendicular to said spindle (25), in phase relation with the rotation of said drum (13).

5. A device, according to claim 4, wherein said gear means include:

a rotating shaft (322) supported by a sleeve (17), which is fastened to the edge of the drum (13), radially thereto;

a bevel gear pair (321) including a first bevel gear (324), keyed onto a free end of, and in line with, the shaft (322), and a second gear (325), keyed in line onto the bead of a turret (9) supporting the drum (13).

6. A device, according to claim 4 wherein said arm (24) carries, keyed onto a radial spindle (25), a toothed wheel (26), around which a toothed belt (27) in mounted, said toothed belt (27) engaging with a pulley (28), which is fastened to the front part of the drum (13), coaxial with the rotation axis of said arm (24), so as to drive said pick up group (14) to counter-rotate, so as to maintain, during rotation of said arm (24), the orientation of said prick up group (14) substantially constant; with unitary transmission ration between said toothed wheel (26) and said pulley (28).

7. A device, according to claim 2, wherein said operating means (20) of said pick up group (14) include a "V"-like cam, fastened to the edge of the drum (13), in correspondence to said pick up group (14), and aimed at being engaged by a roller (47) joined to a shaft (14a) of said pick up group (14).

8. A device, according to claim 7, wherein said shaft (14a) slides inside a tube (48) in directions away from and towards the pile of compact discs, said tube (48) being formed at the end of a lever (49), which is situated radially to the drum (13) and is moved angularly with respect thereto by suitable actuators.

9. A device, according to claim 2, wherein said operating means (20) include an arm (24), which carries said pick up group (14) oscillating with respect to a spindle (25) radial to said drum (13), said arm being rotated by lever means (23) on a plane tangent to a circumference tangent to said drum (13), said lever means (23) following a circular cam (19) made on a stationary turret (9), with said drum (13) rotating on said turret (9).

10. A device, according to claim 9 wherein said arm (24) carries, keyed onto a radial spindle (25), a toothed wheel (26), around which a toothed belt (27) in mounted, said toothed belt (27) engaging with a pulley (28), which is fastened to the front part of the drum (13), coaxial with the rotation axis of said arm (24), so as to drive said pick up group (14) to counter-rotate, so as to maintain, during rotation of said arm (24), the orientation of said prick up group (14) substantially constant; with unitary transmission ration between said toothed wheel (26) and said pulley (28).

11. A device, according to claim 9, wherein said arm (24) is integral with a shaft (22), rotating inside a sleeve (17), which is fastened radially to said drum (13) and to said lever means (23), said lever means (23) following, through a roller (29), said circular cam (19), so as to drive said shaft (22) into rotation.

12. A device, according to claim 9, wherein said circular cam (19) has an additional branch (19a) in the area corresponding to said compact discs (1) being picked up, with said additional branch (19a) engaged by said lever means (23) when baffle means (42) are operated, so as to anticipate the rotation of said arm (24) of said pick up group (14), in order to remove said compact discs (1) from a second magazine (10a).

13. A device, according to claim 2, wherein said operating means (220) include:

a connecting rod (251), freely pivoted on a block (253) which is fastened to the edge of said drum (13), with a shaft (250) of said pick up group (14) being carried, pivoted thereto, by said connecting rod (251) on the end opposite to the end which removes the compact discs (1);

an arm (254) supporting said pick up group (14) and featuring, made therein, a through hole (255), which is oriented in directions away from and towards said pile of compact discs (1) and aimed at allowing said shaft (250) to slide between said connecting rod (251) and picking up means of said pick up group (14);

a linking (260) fastened with one of its ends to the transverse arm (254), and with the other end to a cam following roller (261), said cam following roller (261) determining alternating movements of said arm (254) along a longitudinal direction, in co-operation with guiding means (257) and means (256a,256b) for keeping said arm (254) on said circumferential direction;

a cam (262), which is integral with said turret (109), under said drum (13), and which guides said roller (261) to determine the above mentioned alternate movements.

14. A device, according to claim 13, wherein said guiding means (257) include a circumferential groove made in a collar (258), which is integral with the drum (13).

15. A device, according to claim 13, wherein said fastening means (256a,256b) include a pair of guiding rollers, idle on their axes and applied to the inner surface of the upper part of said arm (254).

16. A device, according to claim 2, wherein said operating means (120) include a shaft (122) supported by said drum (113), substantially radial thereto and rotating freely; a transversal oscillating arm (124), supported by the outer part of said shaft (122) and carrying the pick up group (14), which is pivoted rotating on an spindle (25), radial to said drum (113); a linking (130), which is fastened with one end to said transverse arm (124) and with the other end to a cam following roller (135), determining periodic oscillations of said transverse arm (124); a cam (119), which is integral with said turret (109) under said drum (113) and which guides said roller (135).

17. A device, according to claim 16, wherein said cam (119) is made on the outer edge of a shaped plate (137), which is keyed coaxial with said turret (9), under said drum (113).

18. A device, according to claim 16, wherein said cam (119) has an additional branch (119a) in the region corresponding to the area where the compact discs (1) are removed, with said additional branch (119a) being engaged by said roller (135) when a baffle (142) is operated, so as to anticipate the operation of the oscillation of the arm (124) of said pick up group (14) in order to remove said compact discs (1) from a second magazine (10a).

19. A device, according to claim 16, wherein said transverse arm (124) carries, keyed onto said spindle (25), a toothed wheel (26), around which a toothed belt (27) winds, said toothed belt (27) engaging with a pulley (28), which is fastened to the front part of the drum (113), and which is coaxial with the transverse arm (124) rotation axis, so as to drive said pick up group (14) to counter-rotate in such a way as to maintain the orientation of the pick up group (14) substantially constant during the transverse arm (124) rotation.

20. A device, according to claim 16, wherein said linking (130) includes:
   a first arm (131) fastened to said transverse arm (124) and extending substantially radially;
   a second arm (132), substantially orthogonal to the first one and hinged to the free end thereof, on an axis coincident with the longitudinal axis of said first arm (131);
   a lever (133), whose arms are angled with respect to each other, and which carries, pivoted to its head, the free end of said second arm (132), and on its other end, said cam following roller (135), said lever (133) being pivoted on a pin (134), whose axis is substantially parallel to the axis (x) of said drum (113).

21. A device, according to claim 20, wherein return elastic means (138) extend radially between said lever (133) with angled arms and said drum (113).

22. A device, according to claim 20, wherein said cylindrical roller (135) is joined to said lever (133) with angled arms by a spindle (136), whose axis is substantially parallel to the axis (X) of the drum (113).

* * * * *